Sept. 7, 1937.  L. W. HELLER  2,091,984
FLUID HEAT EXCHANGE APPARATUS
Filed Jan. 15, 1935   4 Sheets—Sheet 1

INVENTOR
Lewis W. Heller
BY
ATTORNEY

Sept. 7, 1937.　　　　　L. W. HELLER　　　　　2,091,984
FLUID HEAT EXCHANGE APPARATUS
Filed Jan. 15, 1935　　　　4 Sheets-Sheet 2
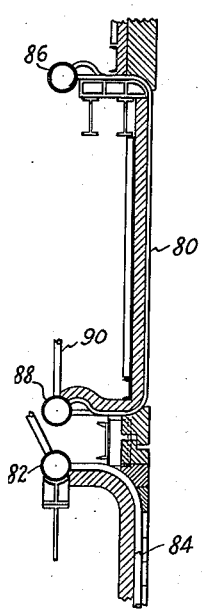
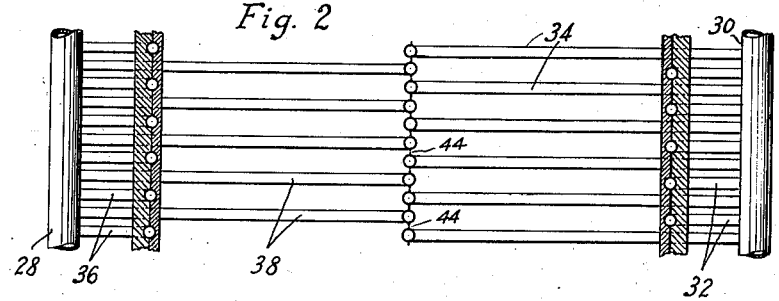
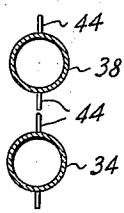
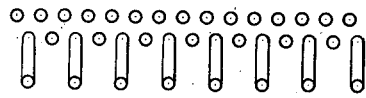
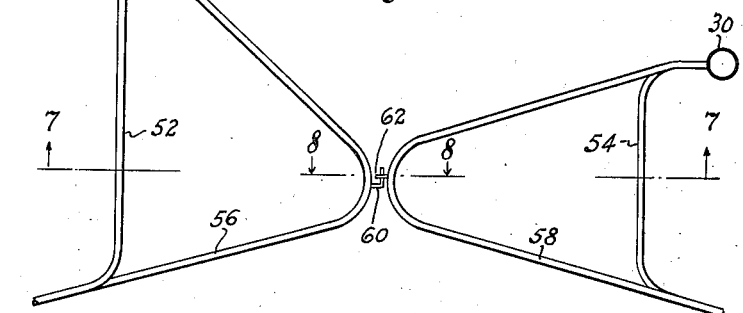
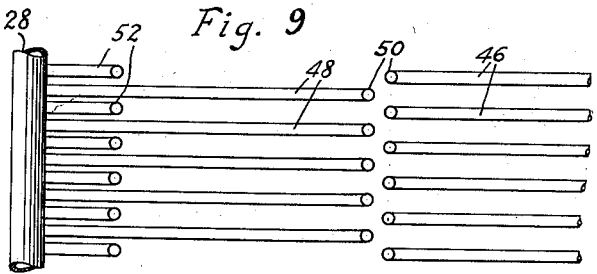
INVENTOR
Lewis W. Heller
BY
ATTORNEY Sept. 7, 1937.   L. W. HELLER   2,091,984
FLUID HEAT EXCHANGE APPARATUS
Filed Jan. 15, 1935   4 Sheets-Sheet 3
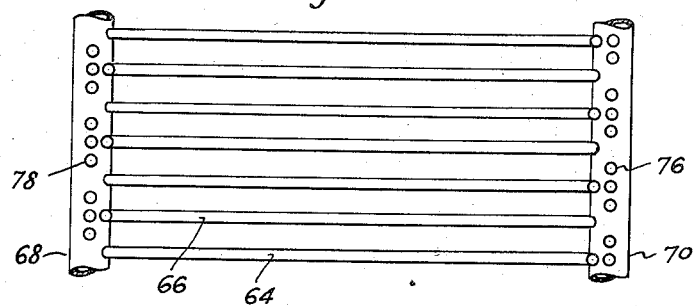
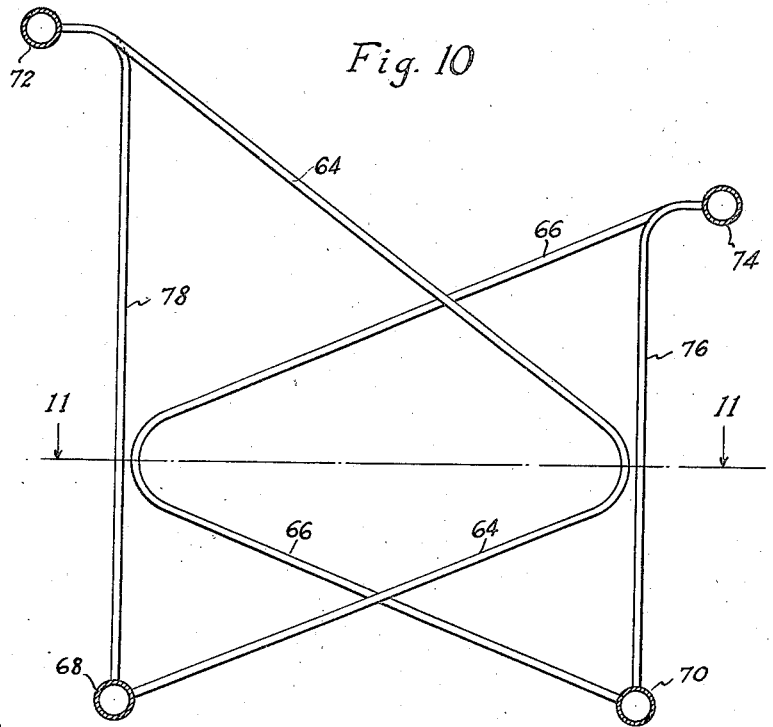
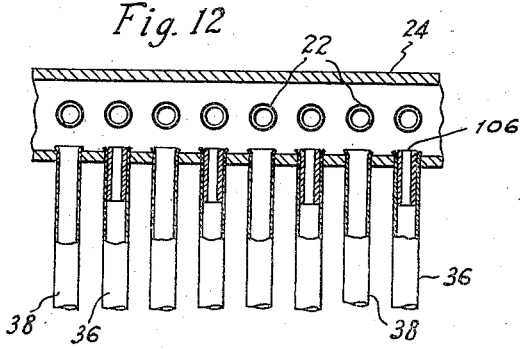
INVENTOR
Lewis W. Heller
BY
ATTORNEY INVENTOR
Lewis W. Heller
BY
ATTORNEY Patented Sept. 7, 1937

2,091,984

UNITED STATES PATENT OFFICE 2,091,984

FLUID HEAT EXCHANGE APPARATUS

Lewis W. Heller, New York, N. Y., assignor to The Babcock & Wilcox Company, Newark, N. J., a corporation of New Jersey Application January 15, 1935, Serial No. 1,839

19 Claims. (Cl. 122—235)

This invention pertains to fluid heat exchange apparatus and it is exemplified herein by a steam boiler having tubes constructed to form a particular type of fluid cooled screen for furnaces.

It is an object of the invention to provide novel furnace screens which by their inherent structural characteristics minimize functional impairment by slag deposits thereon.

It is also an object of the invention to provide a water tube furnace screen which eliminates the use of headers in addition to those which may be employed for providing the walls of a furnace with wall cooling tubes.

Other objects of the invention will appear as the accompanying description proceeds.

The invention will be described with reference to the accompanying drawings in which:

Fig. 2 is a view in the nature of a horizontal section taken on the line 2—2 of Fig. 1 and looking in the direction of the arrows, with certain parts omitted.

Fig. 3 is a vertical section illustrating a radiantly heated superheater for use in connection with the steam boiler.

Fig. 4 is a detail view showing in horizontal section a part of the embodiment of Figs. 1 and 2.

Fig. 5 is a detail sectional view taken on the line 5—5 of Fig. 1 and indicating the spacing of the furnace screen tubes and steam generating tubes.

Fig. 6 is an upright sectional view illustrating another embodiment of part of the invention shown in Fig. 1.

Fig. 7 is a view in the nature of a horizontal section taken at a position indicated by the line 7—7 of Fig. 6 and showing the relative arrangement of the wall tubes of the screen zone.

Fig. 8 is a detail section taken on the line 8—8 of Fig. 6.

Fig. 9 is a view in the nature of a horizontal transverse section, similar to the view indicated in Fig. 7, but illustrating the relative arrangement of the parts in another embodiment of the invention.

Fig. 10 is a view in the nature of a vertical section showing a third embodiment of the invention.

Fig. 11 is a detail view in the nature of a horizontal section taken on the line 11—11 of Fig. 10.

Fig. 12 is a detail section through a lower header and the tubes connected thereto.

Figure 1:
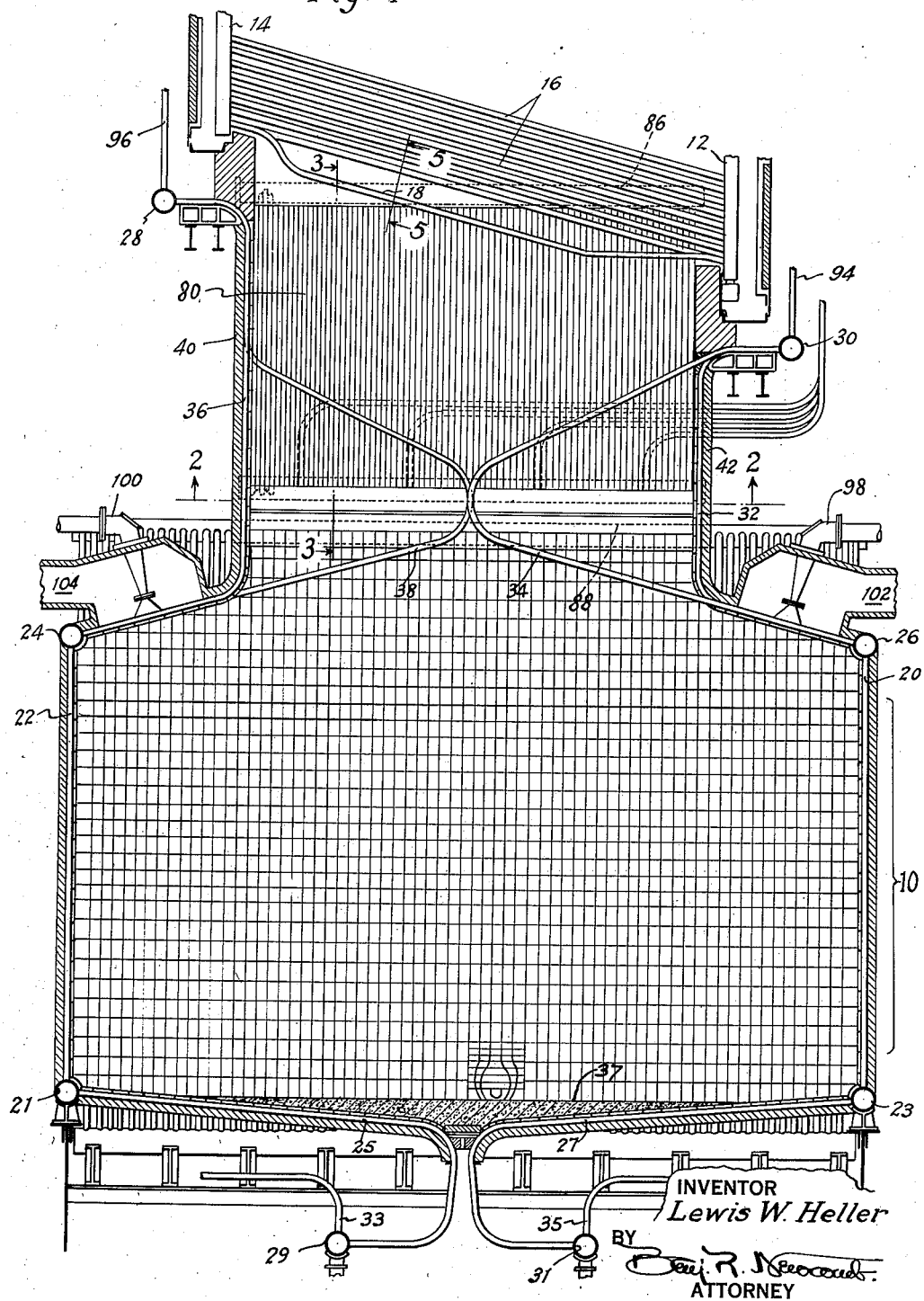
Fig. 1 is a sectional view in the nature of a vertical section indicating the illustrative furnace screen and a steam boiler operated in conjunction therewith.

Referring to Fig. 1 of the drawings, a steam boiler furnace is indicated at 10. Above the furnace is located a water tube steam boiler having rows of headers 12 and 14 connected by steam generating tubes 16 and the furnace screen tubes 18, the upper part of the boiler being omitted.

The illustrative furnace has walls which include water tubes 20 and 22 connected as indicated to the water wall headers 24 and 26. Above these headers there are water wall headers 28 and 30 each of which is shown connected to one of the corresponding lower headers by two series of tubes. For instance, the header 30 is connected to the header 26 by a series of wall tubes 32 at an appropriate spacing. The second series of tubes connecting these headers are the loop tubes 34 forming the furnace screen and supported by the two headers. At the opposite side of the furnace the headers 24 and 28 are similarly connected by a series of wall tubes 36 and a series of screen loop tubes 38.

At either side of the furnace the wall tubes are bordered on their cooler sides by furnace wall structures such as indicated at 40 and 42, and the tubes 20 and 22 are connected to lower side wall headers 21 and 23. Floor tubes 25 and 27 extend from these headers to water headers 29 and 31 connected into the boiler circulation by tubes 33 and 35. The floor tubes support refractory 37 forming a slag tap bottom.

Wall tubes 32 and 36 are located in a part of the furnace which is of relatively low temperature, and the spacing of these tubes, therefore, need not be as close, for example, as the spacing of the wall tubes leading downwardly from the headers 24 and 26. This condition cooperates exceedingly well with applicant's scheme of so forming alternate tubes leaving the header 30 that they constitute a furnace screen. With the combination shown and described, the furnace walls at the positions of the tubes 32 and 34 are adequately cooled and the screen tubes are adequately spaced without the provision of headers in addition to those which would be required for the water wall construction of the furnace. For example, all of the tubes leaving the headers 28 and 30 may be on 6" centers. When alternate tubes in either of these rows are bent or arched to form the illustrative screen these bent tubes will be on 12" centers and the wall tubes not so bent and behind those that are bent are then on 12" centers. Such an arrangement of parts is indicated in Fig. 2 of the drawings.

Referring further to Fig. 2, it will be seen that a screen loop tube of the set 34 connected at its upper end to the header 30 is directly opposite and in alignment with a wall tube of the set 36 connected at its upper end to the opposite header 28. This permits the central ends of the screen loops to be arranged substantially in alignment so that they may be provided with spacers 44 on opposite sides. These loop end spacers may be welded to the tubes and aligned on adjacent tubes so that they will contact to maintain the loop ends of the tubes in their operative relationship.

In Fig. 9 the loop tubes 46 and 48 are arranged so that their central end portions have the staggered arrangement indicated at 50 in Fig. 9. This is an arrangement which may be advantageously employed with a furnace operation which involves the burning of a fuel which produces excessive slag. The arrangement of the wall tubes 52 and 54 relative to the loop tubes is much the same as that indicated in the preceding figures.

In Figs. 6 and 7 the loop tubes 56 and 58 extending at one end from the opposite headers 28 and 30 are in alignment, and their central ends are maintained in position by structural connections. As shown these connections consist of a right angled stud 60 preferably welded to the central part of the tube 56 and an apertured fin or plate 62 preferably welded to the tube 58 and arranged so that its aperture receives the upstanding part of the stud 60. This arrangement permits relative vertical movements of the opposite tubes without allowing the tubes to move otherwise a substantial distance from their desired operative arrangements.

Referring to Figs. 10 and 11 of the drawings, the screen loop tubes 64 and 66 overlap and are alternately supported from opposite sides of the furnace so that they extend entirely across the part of the furnace between the lower headers 68 and 70 and the upper headers 72 and 74. With this arrangement, the spacing of the loop tubes 66 may be four times the spacing of the wall tubes 76 leading from the same lower header 70 and similar conditions exist relative to the loop tubes 64 and the wall tubes 78. One advantage presented by this is that connections similar to those indicated in Fig. 8 of the drawings may be provided between the wall tubes 76 and the loops 64 at a side position where they are not subjected to temperatures as high as at the center positions of the connections illustrated in Fig. 8.

The screen tubes include substantially upright mid-portions which may be termed bights. They connect the upper and lower tube parts one or both of which will be inclined at a substantial angle to the horizontal. One effect of this arrangement is to accelerate the wall tube circulation to such an extent that the tubes are assured more definite protection against overheating. Another effect is that the screen tubes are cooled enough to cause the congealing of molten slag particles which contact therewith.

The screen tubes also constitute structures supported at their ends by headers beyond the furnace walls and having their free loop ends extending out into the combustion space. The weight of the loop tubes imposes a tension load on the upper leg and a column type of load on the lower leg, while leaving the whole tube free to expand. Additional weight of frozen slag is easily supported producing a negligible stress in the metal.

The gases from the lower portion of the furnace may pass freely upwardly around the loops of the screen and these loops provide in effect rows of spaced tubes at two different levels, across the gas path. They therefore receive radiant heat from the hottest portion of the furnace which is the lower part, and by preventing its passage to the upper space above the loops and within the loops, keep such zones cooler than would otherwise be the case. In addition, such cooling of gases carrying molten slag in suspension, causes the slag to freeze so it will not stick to the boiler tubes above, and so much slag as touches them adheres and subsequently runs down or drops off without bridging the gap between tubes to obstruct gas flow.

The upper portion of the furnace above the screen is cooler than the lower portion below it, and a considerable part of the radiant heat from the lower part is prevented from reaching the upper part, especially the walls of the upper part.

Fig. 3 of the drawings represents a side wall construction in which a radiant superheater 80 is employed in a position to receive radiant heat from the gas body above the screen tubes while being protected in part by the screen from the radiant heat of the hotter lower part of the furnace. This superheater is shown located above a side wall header 82 having the furnace wall tubes 84 connected thereto. It includes an upper header 86 and a lower header 88 connected by wall tubes. Steam may be supplied to this superheater directly from the steam space of the boiler through the tubes 90. There may also be a convection superheater connected with the radiant superheater in series or in parallel. With reference to the different forms of triangular loop tube screens shown, it is to be understood that all may be arranged relative to a furnace and a boiler in the same way as the screen tubes in Fig. 1 of the drawings. Furthermore, such connections between adjacent portions of opposite slag screen tubes as are indicated in Figs. 6 and 7 of the drawings may be employed in connection with the tubes shown in the other figures. For example, such connections may be used between the upright mid-portions of the tubes indicated in Fig. 9, and they may also be employed in connection with the slag screen tubes which are shown in Fig. 10. One function of these connections is to maintain the spacing of the slag screen tubes so that they will have a substantially uniform effect entirely across the furnace or the furnace outlet.

In the organization shown in Fig. 1 the upper furnace wall headers 28 and 30 may be connected into fluid circulation by the tubes 94 and 96. They may, for example, be connected to the steam and water drum of the boiler. The furnace is shown as equipped with opposite burners 98 and 100. Secondary air for the burners is supplied through the conduits 102 and 104.

As indicated in Fig. 12 of the drawings, certain of the tubes connected to the header 24 are fitted with ferrules 106. They are shown fixed within the ends of the tubes at the header. The number of these ferrules and the size of the bores through them effect the desired distribution of fluid flow between the slag screen tubes and the wall tubes.

Figure 13:
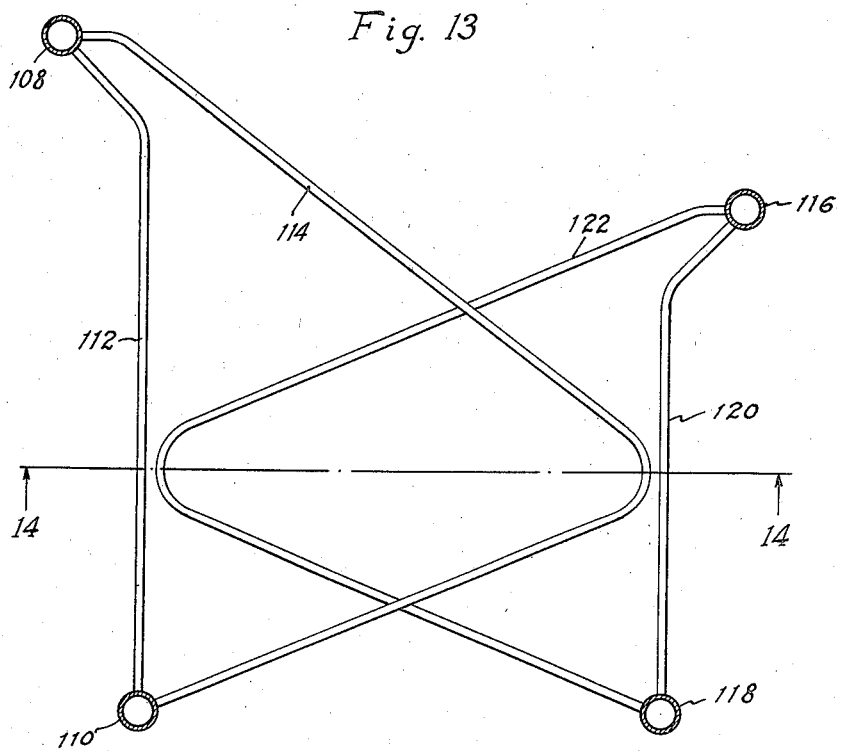
Fig. 13 is a view in the nature of a vertical section, showing an additional embodiment of the screen loop tubes of the invention.
Figure 14:
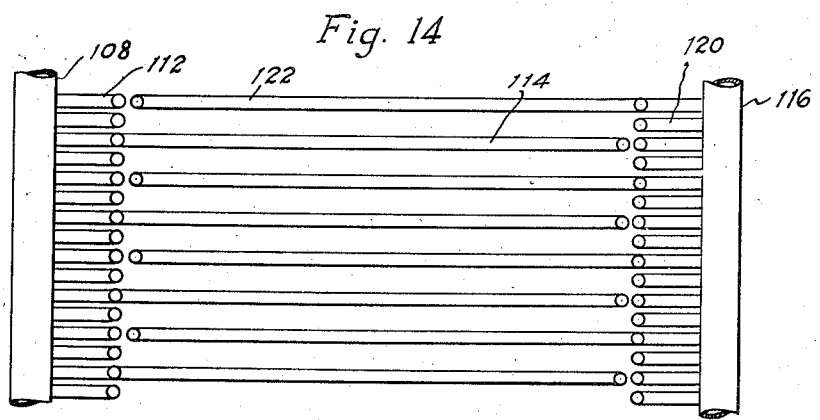
Fig. 14 is a view in the nature of a horizontal section taken on the line 14—14 of Fig. 13.

In Figs. 13 and 14 of the drawings the upper header 108 is connected to a lower header 110 by wall tubes 112 which are spaced across the face of the wall at any desired center to center distance. For example, they may be on 6" centers. The upper ends of the screen tubes 114 are connected to the header 108 at positions circumferentially spaced from the line of the connections of the tubes 112 with that header. The lower ends of the tubes 114 are similarly connected to the lower header 110, and the headers 116 and 118, at the other side of the furnace, are similarly connected by wall tubes 120 and slag screen tubes 122. In this case the spacing of the screen tubes is quite independent of the spacing of the wall tubes, so that any degree of cooling or screening that may be desired, can be secured.

The furnace screen is both a radiant heat screen and a slag screen, between a lower hotter portion and upper cooler portion of the furnace. Each tube of the screen is supported at its ends on one side of the furnace, all of the rest of the tube being free and extending into or across the furnace.

Whereas, for the purposes of fulfilling the requirements of the statutes this invention has been described with reference to structural embodiments of the invention, it is to be appreciated that the invention is not limited to the particular constructions shown, but that it is of a scope commensurate with the scope of the subjoined claims.

What is claimed is:

1. In combination with a steam boiler, a furnace, upper and lower water wall headers at opposite sides of the furnace, wall tubes arranged in alignment and connected to the headers at opposite sides of the furnace, screen tubes in the form of loops interspersed with reference to the wall tubes where they are connected to the headers and arranged with their bights entirely within the furnace gases at the upper portion of the furnace, a convection fluid heat exchange section beyond the loop tubes with reference to gas flow, and means for burning a slag forming fuel below the loops of the screen tubes so that the furnace gases pass upwardly across and around those tubes.

2. In combination with a steam boiler, a furnace, upper and lower water wall headers at the sides of the furnace, water wall tubes connecting the headers, loop tubes interspersed with reference to the wall tubes and extending across the outlet of the furnace, a convection fluid heat exchange section beyond the loop tubes with reference to gas flow, and means for burning a slag forming fuel forwardly of the loop tubes so that slag particles are carried by the furnace gases as they pass upwardly across the loop tubes.

3. In combination, a steam boiler including steam generating tubes extending across a gas pass, a furnace, upper and lower water wall headers at opposite sides of the furnace, wall tubes connecting the headers and arranged in wall forming alignment at opposite sides of the furnace, screen tubes in the form of loops connected to the same headers and arranged in alignment with the wall tubes at their ends adjacent the headers, the inner end portions or bights on the screen tubes being arranged in alignment with their loops somewhat overlapped, and spacers rigid with the screen tubes at their bights and so disposed that the spacers on adjacent bights will contact with each other to maintain the screen tubes in operative relationship.

4. In fluid heat exchange apparatus, a furnace having two opposite rows of wall cooling tubes with alternate tubes of each row being bent out of the row to form a double arch slag screen, said slag screen extending substantially all the way across the furnace, fluid heat exchange tubes contacted by the furnace gases beyond the slag screen, means for burning a slag forming fuel in the furnace, and means for connecting all of said tubes into fluid circulation.

5. In a single pass high capacity steam boiler, a bank of convection heated horizontally inclined steam generating tubes including a boiler slag screen at the lower part of the bank, a furnace burning a slag forming fuel, opposite rows of furnace wall cooling tubes arched into the furnace to form a furnace slag screen in front of the boiler slag screen, and means for connecting the tubes into fluid circulation.

6. In combination, a slag tap furnace, means for burning a slag forming fuel in a primary combustion chamber of the furnace, a bank of inclined steam generating tubes including a boiler slag screen exposed to gas from the furnace, opposite rows of spaced furnace wall cooling tubes connected into wall tube circulation circuits, and oppositely directed looped tubes forming a furnace slag screen positioned forwardly of the boiler slag screen and connected into the wall tube circuits.

7. In a furnace having two opposite rows of wall cooling tubes, some of the tubes having portions looped across the furnace to constitute a double arch furnace slag screen, means for burning a slag forming fuel so that slag laden furnace gases pass across said looped tube portions, a convection section consisting of spaced tubes extending across the path of the furnace gases beyond the slag screen, and means providing a furnace gas outlet beyond said convection section.

8. In a steam boiler furnace with opposite walls having rows of upright wall cooling tubes with some of the tubes of each row being bowed toward the opposite wall to form a furnace slag screen in the nature of a cantilever truss, a convection section beyond the slag screen with reference to gas flow and means for burning a slag forming fuel to supply slag laden furnace gases which pass upwardly over the slag screen, the portions of each of said bowed tubes constituting upper and lower cantilever chords which are enveloped in succession by the furnace gases.

9. In combination, means for burning a slag forming fuel in a primary combustion chamber of the furnace, a bank of inclined steam generating tubes including a boiler slag screen exposed to gas from the furnace, opposite rows of spaced furnace wall cooling tubes connected into wall tube circulation circuits, oppositely directed looped tubes forming a furnace slag screen positioned between the fuel burning means and the boiler slag screen.

10. In a furnace having two opposite rows of wall cooling tubes, some of the tubes having portions looped so as to extend almost all the way across the furnace to constitute a double arch furnace slag screen, means for burning a slag forming fuel so that slag laden furnace gases pass across said looped tube portions, a convection section consisting of spaced tubes extending across the path of the furnace gases beyond the slag screen, and means providing a furnace gas outlet beyond said convection section.

11. In a steam boiler furnace with opposite walls having rows of wall cooling tubes with some of the tubes of each row being bowed toward the opposite wall to form furnace slag screens, the screen tubes extending from one wall being alternately arranged with respect to the screen tubes extending from the opposite wall.

12. In combination, a bank of convection heated fluid heat exchange tubes, a fuel burner positioned forwardly of said tubes with reference to gas flow, opposite walls defining a furnace gas passage from the burner to the bank of tubes, a row of substantially U-shaped tubes having their midportions extending transversely of said passage and their ends fixed relative to one of said walls so as to form therewith a triangular slag screen structure positioned between the burner and said bank of tubes, means connecting the U-tubes into fluid circulation, at least one of the legs of each U-tube having a sharp inclination to the horizontal, said slag screen extending a substantial distance into the path of the furnace gases moving through said passage, and a furnace wall below said U-shaped tubes, said wall including wall tubes the upper ends of which are in communication with said U-shaped tubes.

13. In combination, a bank of steam generating tubes, a combustion chamber having opposite walls including spaced wall cooling tubes, a furnace extension interposed relative to the combustion chamber and said bank of tubes and having opposite walls disposed inwardly relative to the combustion chamber walls, upper headers having the first wall tubes extending downwardly therefrom and the lower parts of wall tubes for the extension leading inwardly therefrom over the combustion chamber, V-shaped slag screen tubes having their lower parts interspersed relative to the last mentioned wall tubes and connected to said headers, downwardly directed fuel burners positioned upon the lower parts of the slag screen tubes and the extension wall tubes at both sides of the furnace, and means for connecting all of said tubes into fluid circulation, the slag screen tubes forming with the extension walls triangular structures projecting into the path of furnace gases from opposite sides of the furnace.

14. In a furnace for fluid heat exchange apparatus, an upper wall tube header, a lower wall tube header, furnace wall tubes communicating with the headers and connected into fluid circulation, furnace screen tubes communicating with said headers at positions substantially circumferentially spaced from the positions at which the wall tubes are connected to the headers, said screen tubes being looped so that they extend across the furnace from the wall along which the first mentioned tubes are arranged, means for burning a slag forming fuel so that slag laden gases pass across the looped screen tubes, and a convection section consisting of spaced tubes extending across the path of the furnace gases beyond the screen tubes.

15. In combination with a steam boiler and its furnace, upper headers and lower headers at opposite sides of the furnace, furnace wall cooling tubes closely spaced in rows at opposite sides of the furnace and connecting each upper header with a lower header at the same wall, slag screen tubes in the form of loops extending transversely of the furnace alternately from opposite sides thereof to overlapping positions and connected to the headers at positions spaced circumferentially of the headers from the positions at which the wall tubes are connected, and means for burning a slag forming fuel in a combustion chamber beneath the screen formed by said looped tubes, the furnace gases and slag in suspension passing directly upwardly across the screen tubes from the combustion chamber.

16. In a furnace having two opposite rows of wall cooling tubes, upper and lower headers at corresponding ends of said rows of tubes, and overlapping looped slag screen tubes extending alternately from opposite walls across the furnace and connected to the headers at positions spaced circumferentially of the headers from the positions at which the wall tubes are connected thereto.

17. In fluid heat exchange apparatus, a furnace, means for burning fuel in the furnace, a set of furnace screen tubes connected into a fluid circulation and extending across the path of the furnace gases, a set of fluid heat exchange tubes connected into the same circulation, means forming a fluid chamber communicating with the inlet ends of all of said tubes, and means for proportioning the fluid flowing from said chamber to said tubes so that there will be a flow through the screen tubes sufficient to prevent overheating thereof.

18. In apparatus of the class described, a furnace; means for burning a slag forming fuel in suspension in the combustion chamber of the furnace; a convection section including spaced fluid heating tubes extending across the path of the furnace gases at the furnace outlet; a slag screen positioned above the combustion chamber and across the path of the furnace gases passing to said outlet; said slag screen including fluid conducting tubes having their upper and lower ends anchored at the same side of the furnace and their remaining parts looped into the furnace across the path of the gases; a furnace wall including wall tubes communicating at their upper ends with the screen tubes and positioned below the screen tubes and means for connecting said screen tubes and the wall tubes into a fluid circulation.

19. In apparatus of the class described, a furnace including wall tubes, a bank of fluid heat exchange tubes contacted by the furnace gases, looped gas mixing tubes having their ends anchored at different elevations at the same side of the furnace and having the upper and lower portions of their loops enveloped by the furnace gases moving toward said bank of tubes, said loops extending from one wall of the furnace toward the other wall, and means establishing communication between the looped tubes and the upper ends of the wall tubes whereby the looped tubes act as risers or discharge tubes.

LEWIS W. HELLER.